(12) United States Patent
Xu

(10) Patent No.: US 7,479,769 B2
(45) Date of Patent: Jan. 20, 2009

(54) POWER DELIVERY SYSTEM HAVING CASCADED BUCK STAGES

(75) Inventor: Peng Xu, Danbury, CT (US)

(73) Assignee: NXP B.V., Eindhoven (NL)

( * ) Notice: Subject to any disclaimer, the term of this patent is extended or adjusted under 35 U.S.C. 154(b) by 384 days.

(21) Appl. No.: 10/570,245

(22) PCT Filed: Aug. 23, 2004

(86) PCT No.: PCT/IB2004/051535

§ 371 (c)(1),
(2), (4) Date: Feb. 28, 2006

(87) PCT Pub. No.: WO2005/022737

PCT Pub. Date: Mar. 10, 2005

(65) Prior Publication Data

US 2007/0001653 A1 Jan. 4, 2007

Related U.S. Application Data

(60) Provisional application No. 60/498,859, filed on Aug. 29, 2003.

(51) Int. Cl.
*G05F 1/40* (2006.01)

(52) U.S. Cl. .................................................. 323/271
(58) Field of Classification Search ......... 323/222–225, 323/268, 271, 282, 290
See application file for complete search history.

(56) References Cited

U.S. PATENT DOCUMENTS

| | | | | |
|---|---|---|---|---|
| 5,006,782 | A * | 4/1991 | Pelly | 323/225 |
| 5,886,508 | A * | 3/1999 | Jutras | 323/267 |
| 6,246,592 | B1 * | 6/2001 | Balogh et al. | 363/16 |
| 6,348,781 | B1 * | 2/2002 | Midya et al. | 323/224 |

* cited by examiner

*Primary Examiner*—Matthew V Nguyen
(74) *Attorney, Agent, or Firm*—Peter Zawilski

(57) ABSTRACT

A power delivery system for a microprocessor or other ASIC. The power delivery system includes a plurality of cascaded buck stages connected in series, wherein a last buck stage in the plurality of cascaded buck stages provides an output voltage $V_o$ in response to an input voltage $V_{in}$ applied to a first buck stage of the plurality of cascaded stages. A duty cycle control regulates a duty cycle of each buck stage to maintain the output voltage $V_o$. The duty cycle control sets the duty cycle of the first buck stage of the plurality of cascaded buck stages to 1 if an input-to-output voltage ratio ($V_{in}/V_o$) is lower than a threshold input-to-output voltage ratio $R_T$.

20 Claims, 3 Drawing Sheets

POWER DELIVERY SYSTEM HAVING CASCADED BUCK STAGES

CROSS REFERENCE TO RELATED APPLICATION

This application claims the benefit of U.S. provisional application Ser. No. 60/498,859 filed Aug. 29, 2003 which is incorporated herein in whole by reference.

The present invention relates in general to integrated circuits, and more particularly, to a power delivery system having cascaded buck stages for use with microprocessors and other application specific integrated circuits (ASICs).

FIG. 1 shows a typical single-stage buck power delivery system 10 for use with modern microprocessors. The single-stage buck power delivery system 10 includes a Voltage Regulator Module (VRM) 12 that is located close to microprocessor 14 in order to deliver a highly accurate supply voltage. VRM 12 comprises a single-stage buck that includes one or more interleaved synchronous buck channels 16 arranged in parallel. The input voltage $V_{in}$ is typically a pre-regulated bus voltage of 12 V+/−15% or a battery voltage of 6-24 V, and the output voltage $V_o$ is the processor voltage of 0.x-1.x V. Most of today's VRMs runs at a range of switching frequency from 200 KHz to 300 KHz.

As shown in FIG. 1, each buck channel 16 includes a pair of switches $SW_1$, $SW_2$, which are generally implemented using field effect transistors or other suitable switching devices. The opening and closing of the switches $SW_1$, $SW_2$, is controlled by a duty cycle control 18 that adjusts the duty cycle of the switches $SW_1$, $SW_2$, in a known manner based on the output voltage $V_o$. Each buck channel 16 also includes an inductor L and a capacitor C. The operation of this type of single-stage buck is well known and will not be described in further detail.

Typically, VRM 12 operates at a very small duty cycle because of the use of a high input voltage $V_{in}$ and a low output voltage $V_o$ (duty cycle $D=V_o/V_{in}$). This results in a substantial power loss, due to significant switching losses at switch $SW_1$, which is switched on for a short time, and large conduction losses at $SW_2$, which is switched on for a very long time.

Microprocessors are continually being designed to operate at lower voltages, higher currents, and higher current slew rates. In order to meet the more stringent transient requirements without overly increasing output capacitance, the switching frequency of a Voltage Regulator Module (VRM) needs to be increased to the MHz range to reduce output inductance and increase control-loop bandwidth to achieve faster transient responses. The negative effect of increasing switching frequency, however, is reduced VRM efficiency (i.e., higher power losses) since switching losses are directly proportional to the switching frequency. Therefore, it has become a significant challenge to reduce the power loss of VRMs at increased switching frequencies.

The present invention provides a two-stage power delivery system that employs cascaded buck stages. For high input-to-output voltage ratios, each cascaded buck stage has a more suitable (i.e., larger) duty cycle that results in a much lower total power loss than in a single-stage buck. For applications requiring lower input-to-output voltage ratios, such as battery powered laptops, the cascaded buck arrangement of the present invention can be operated in a quasi-single-stage mode, wherein the first buck stage operates as an input filter.

In a first aspect, the present invention provides a power delivery system, comprising: a plurality of cascaded buck stages connected in series, wherein a last buck stage in the plurality of cascaded buck stages provides an output voltage $V_o$ in response to an input voltage $V_{in}$ applied to a first buck stage of the plurality of cascaded stages; and a duty cycle control for controlling a duty cycle of each buck stage to maintain the output voltage $V_o$, wherein the duty cycle control sets the duty cycle of the first buck stage of the plurality of cascaded buck stages to 1 if an input-to-output voltage ratio $(V_{in}/V_o)$ is lower than a threshold input-to-output voltage ratio $R_T$.

In a second aspect, the present invention provides a method for power delivery, comprising: connecting a plurality of cascaded buck stages in series, wherein a last buck stage in the plurality of cascaded buck stages provides an output voltage $V_o$ in response to an input voltage $V_{in}$ applied to a first buck stage of the plurality of cascaded stages; and controlling a duty cycle of each buck stage to maintain the output voltage $V_o$, wherein the duty cycle of the first buck stage of the plurality of cascaded buck stages is set to 1 if an input-to-output voltage ratio $(V_{in}/V_o)$ is lower than a threshold input-to-output voltage ratio $R_T$.

In a third aspect, the present invention provides a quasi-single-stage power delivery system, comprising: first and second cascaded buck stages connected in series, wherein the second buck stage provides an output voltage $V_o$ in response to an input voltage $V_{in}$ applied to the first buck stage; and a duty cycle control for controlling duty cycles of the first and second buck stages to maintain the output voltage $V_o$, wherein the duty cycle of the first buck stage is set to 1 if an input-to-output voltage ratio $(V_{in}/V_o)$ is lower than a threshold input-to-output voltage ratio $R_T$, and wherein the duty cycle of the first buck stage is set to a value less than 1 if the input-to-output voltage ratio $(V_{in}/V_o)$ is higher than the threshold input-to-output voltage ratio $R_T$.

These and other features of this invention will be more readily understood from the following detailed description of the various aspects of the invention taken in conjunction with the accompanying drawings in which.

It should be noted that the drawings are merely schematic representations, not intended to portray specific parameters of the invention. The drawings are intended to depict only typical aspects of the invention, and therefore should not be considered as limiting the scope of the invention.

Figure 2:
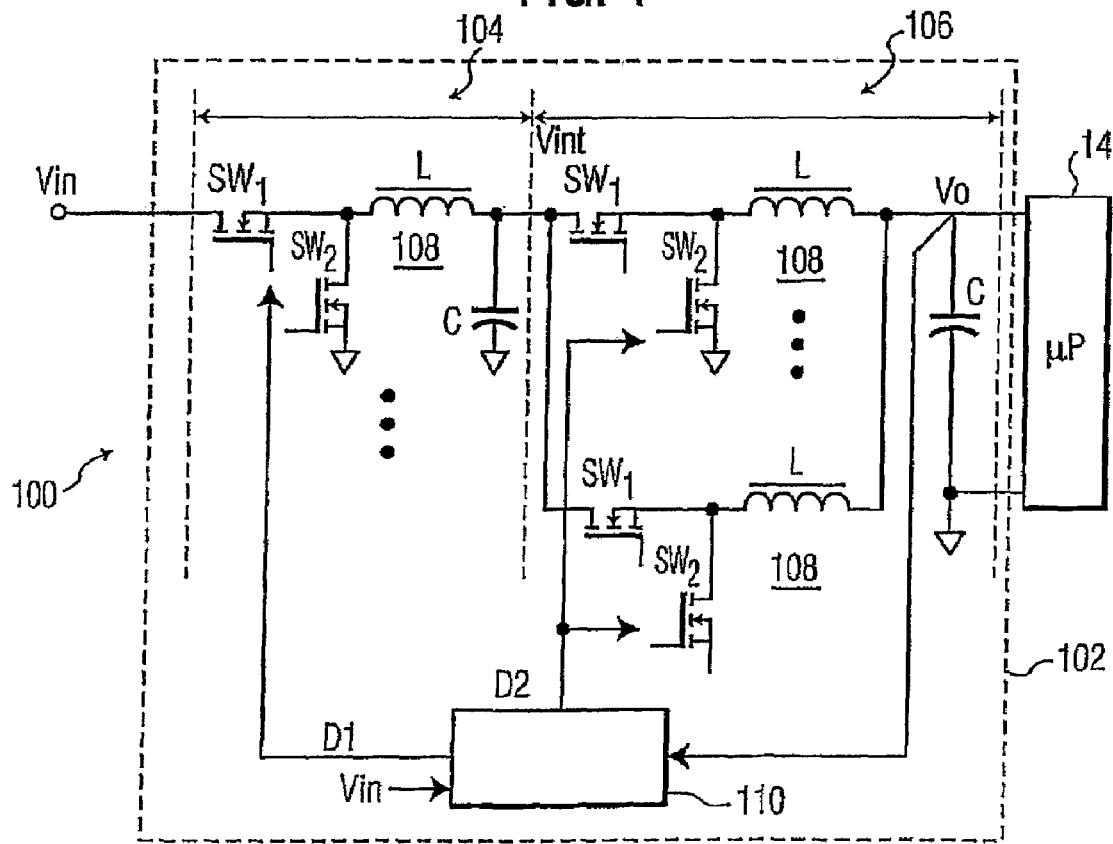
FIG. 2 illustrates a two-stage cascaded buck power delivery system in accordance with the present invention.

FIG. 2 illustrates a two-stage cascaded buck power delivery system 100 in accordance with the present invention. Although described below as including two cascaded buck stages, it should be noted that more than two buck stages may be cascaded together without departing from the scope of the present invention as claimed. The two-stage cascaded buck power delivery system 100 includes a Voltage Regulator Module (VRM) 102 comprising a cascaded arrangement of a first buck stage 104 and a second buck stage 106 connected in series. The two-stage cascaded buck power delivery system 100 operates to provide an output voltage $V_o$ at the output of the second buck stage 106 in response to an input voltage $V_{in}$ applied to the input of the first buck stage 104. Both the first buck stage 104 and second buck stage 106 comprise one or more interleaved synchronous buck channels 108 arranged in parallel. The input voltage $V_{in}$ is typically a pre-regulated bus voltage of 12 V+/−15% or a battery voltage of 6-24 V, and the output voltage $V_o$ is the processor voltage of 0.x-1.x V.

As shown in FIG. 2, each buck channel 108 in the first and second buck stages 104, 106, includes a pair of switches $SW_1$, $SW_2$, which are generally implemented using field effect transistors or other suitable switching devices. Each buck channel 108 in the first and second buck stages 104, 106, further includes an inductor L and a capacitor C. The first buck stage 104 operates in a known manner to provide an intermediate voltage $V_{int}$ at its output in response to an input voltage $V_{in}$ applied to its input, wherein $V_{in} > V_{int}$. The second buck stage 106 also operates in a known manner to provide an output voltage $V_o$ at its output in response to the intermediate voltage $V_{int}$ output by the first buck stage 104, wherein $V_{in} > V_{int} > V_o$.

The opening and closing of the switches $SW_1$, $SW_2$, in the first and second buck stages 104, 106, is controlled by a duty cycle control 110. In particular, the duty cycle control 110 controls the switches $SW_1$, $SW_2$, in the first buck stage 104 via a first duty cycle signal D1, and controls the switches $SW_1$, $SW_2$, in the second buck stage 106 via a second duty cycle signal D2.

Figure 3:
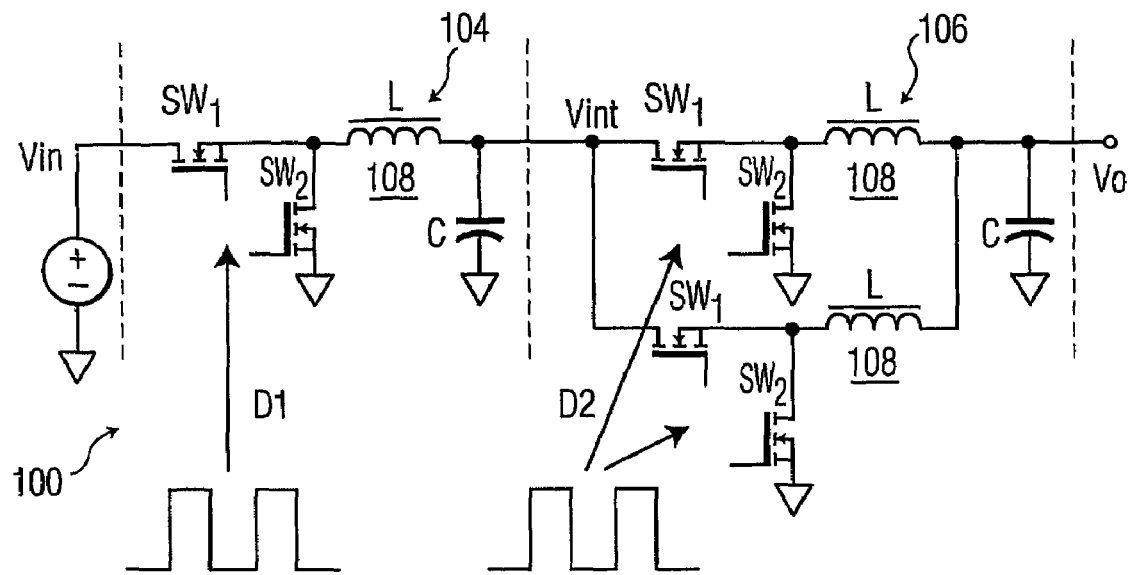
FIG. 3 illustrates an exemplary two-stage cascaded buck power delivery system in accordance with the present invention.

The first and second buck stages 104, 106, are operated at duty cycles D1 and D2, respectively, as shown in FIG. 2 and in the exemplary embodiment of the present invention illustrated in FIG. 3. In FIG. 3, the first buck stage 104 is shown as including a single buck channel 108, while the second buck stage 106 is shown as including a pair of interleaved synchronous buck channels 108 arranged in parallel. Although not shown in FIG. 3 (or FIG. 5), the duty cycles D1 and D2 are provided by the duty cycle control 110 as illustrated in FIG. 2. In general, the duty cycle D1 is given by $V_{int}/V_{in}$ and the duty cycle D2 is given by $V_o/V_{int}$. As such, D1 and D2 are both larger than the duty cycle D of the single-stage buck power delivery system 10 of FIG. 1. Because of the larger duty cycles, the respective switches $SW_1$, $SW_2$, in the first and second buck stages 104, 106, can have a lower current stress and/or a lower voltage stress (compared to the single-stage buck of FIG. 1), which results in reduced switching power losses.

In practice, both D1 and D2 can be varied to maintain output voltage regulation. Alternately, in some designs, either D1 or D2 can be held at a fixed value, while the other duty cycle D2 or D1 is varied to maintain output voltage regulation. Additionally, in other designs, D1 and D2 can be generated from a single source such that D1 is equal to D2. In such a case, $D1 = D2 = (V_o/V_{in})^{1/2}$. Compared to the duty cycle D of the single-stage buck (i.e., $D = V_o/V_{in}$) with the same input and output voltages, the switch duty cycle in the two-stage cascaded buck will always be larger, resulting in lower switching power losses.

Figure 1:
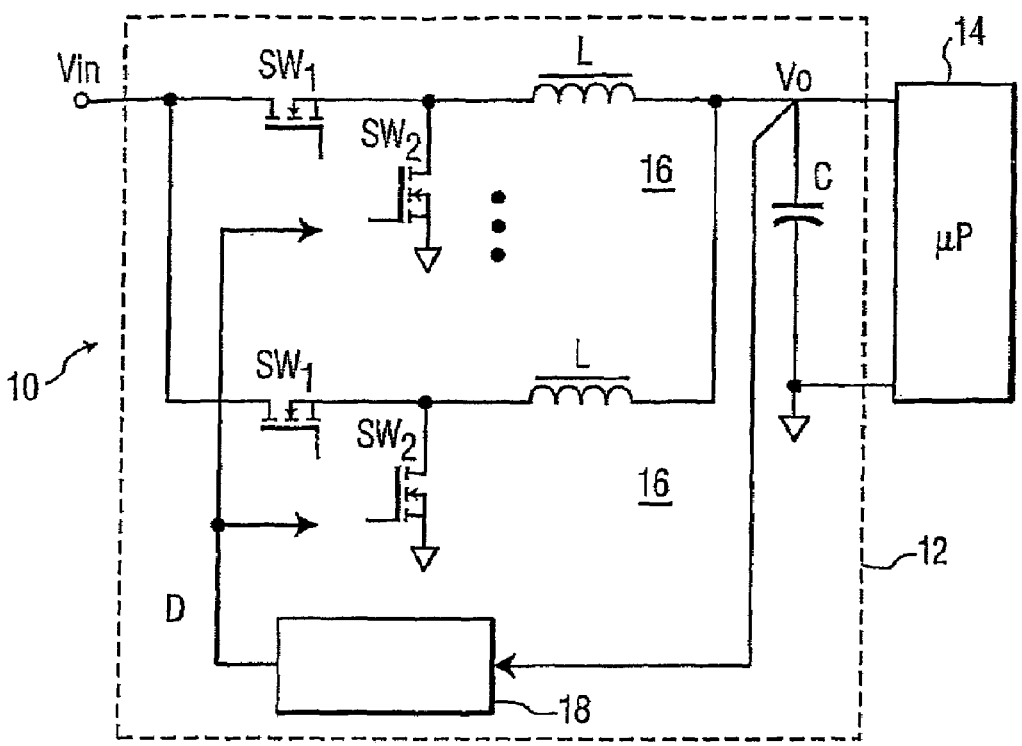
FIG. 1 illustrates a known single-stage buck power delivery system comprising one or more interleaved synchronous buck channels.
Figure 4:
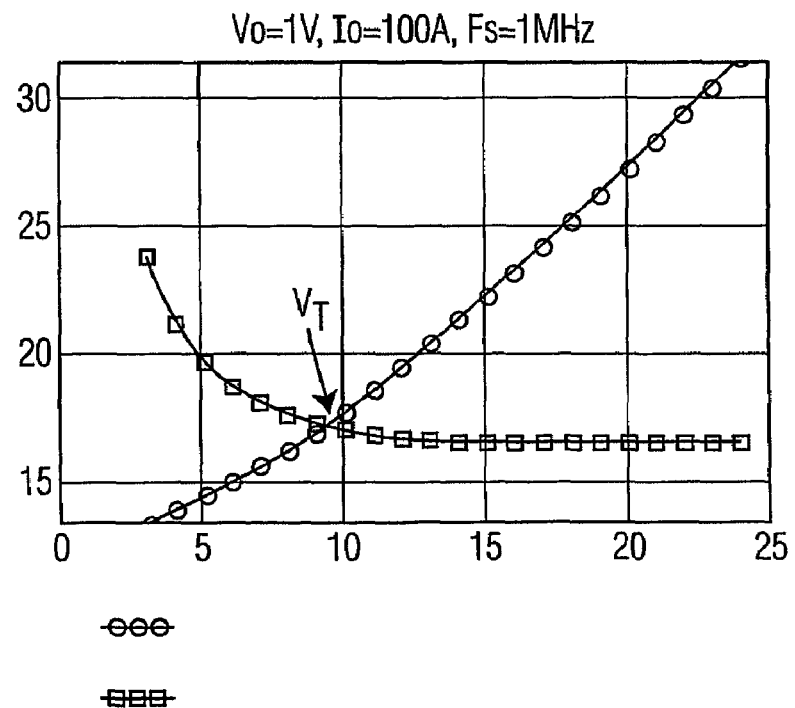
FIG. 4 illustrates a power loss comparison for the single-stage and two-stage cascaded buck power delivery systems of FIGS. 1 and 2.

A power loss comparison for the single-stage and two-stage cascaded buck power delivery systems 10, 100, of FIGS. 1 and 2, respectively, is illustrated in FIG. 4. In particular, FIG. 4 provides a graph of total device power loss vs. input voltage for a one-stage buck of the prior art and the two-stage cascaded buck of the present invention, assuming $V_o = 1V$, $I_o$ (output current) = 100 A, and $F_s$ (switching frequency) = 1 MHz. As shown, for high input-to-output voltage ratios (e.g., at input voltages greater than a threshold voltage $V_T$ of about 9V), the total device power loss is lower for the two-stage cascaded buck of the present invention than for the one-stage buck of the prior art. It should be noted that the threshold voltage $V_T$ as described herein corresponds to the cross-over point in FIG. 4.

Figure 5:
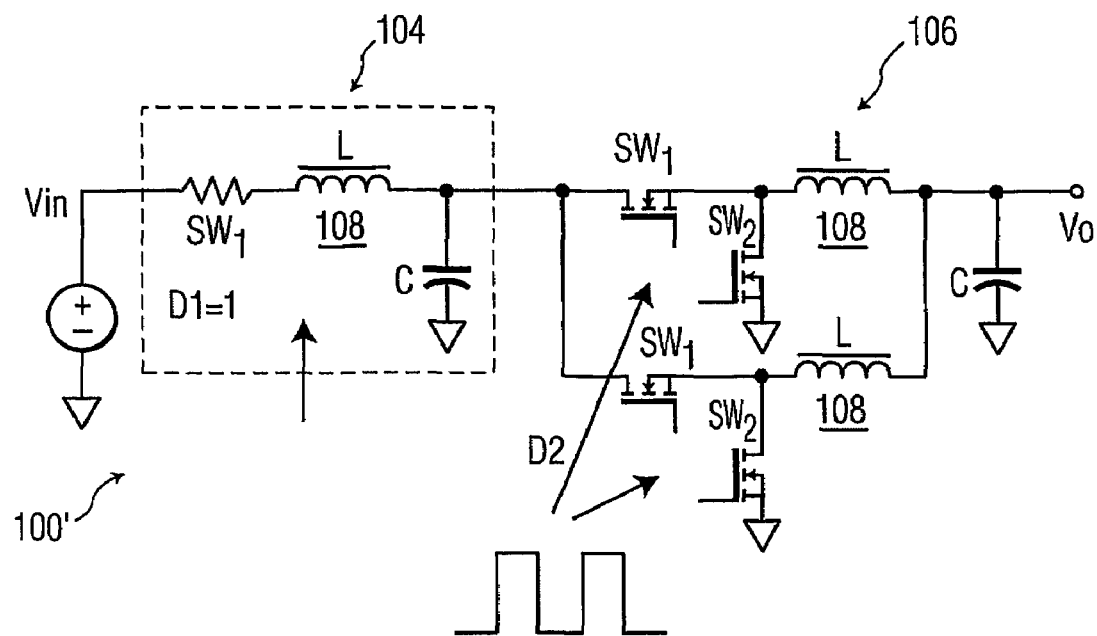
FIG. 5 illustrates the power delivery system of FIG. 2 operating in a quasi-single-stage mode.

At lower input-to-output voltage ratios (e.g., at input voltages lower than a threshold voltage $V_T$ of about 9V), it can be seen in FIG. 4 that use of the two-stage cascaded buck of the present invention results in a greater total device power loss than for the one-stage buck. In order to reduce power loss at lower input-to-output ratios, therefore, the two-stage cascaded buck of the present invention can be operated in a quasi-single-stage configuration 100' as shown in FIG. 5. This is accomplished by setting the duty cycle D1 of the first buck stage 104 to 1 using the duty cycle control 110 (FIG. 2). As a result, the switch $SW_1$ of the first buck stage 104 is always on and the corresponding switch $SW_2$ is always off. As shown in FIG. 5, switch $SW_1$ (always on) is equivalent to its on resistance R. To this extent, the first-stage buck 104 operates as an input filter under the quasi-single-stage configuration, and the input filter for the power delivery system can be reduced. It should be noted that the second buck stage 106 still operates at a duty cycle D2 in the quasi-single-stage configuration illustrated in FIG. 5.

By setting the duty cycle D1 of the first buck stage 104 to 1 at low input-to-output voltage ratios, the switching losses due to the operation of the switches $SW_1$, $SW_2$, in the first buck stage 104 are eliminated. To this extent, the quasi-single-stage configuration of the present invention has a reduced power loss at low input-to-output voltage ratios.

Figure 6:
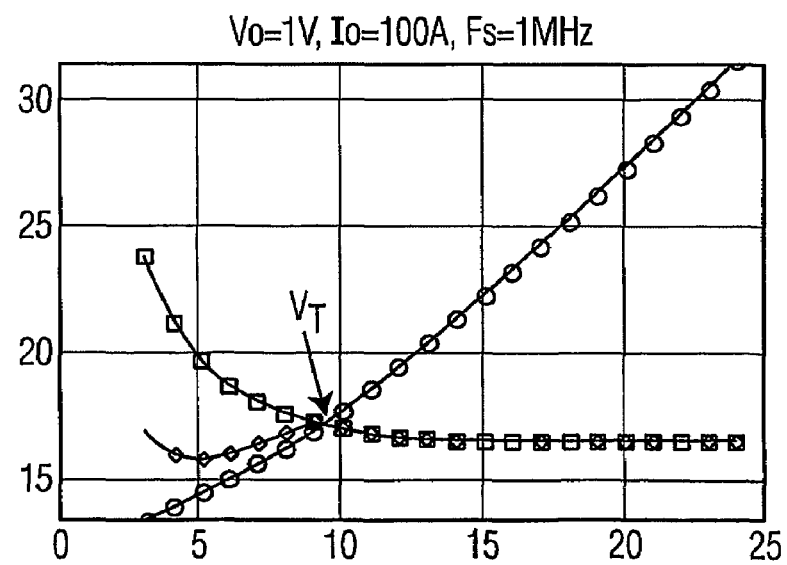
FIG. 6 illustrates a power loss comparison for the single-stage, two-stage, and quasi-single-stage power delivery systems of FIGS. 1, 2, and 5.

A power loss comparison for the single-stage, two-stage cascaded buck, and quasi-single-stage power delivery systems 10, 100, 100' of FIGS. 1, 2, and 5, respectively, is illustrated in FIG. 6. As detailed above, for high input-to-output voltage ratios (e.g., at input voltages greater than a threshold voltage $V_T$ of about 9V), the total device power loss can be lower for the two-stage cascaded buck of the present invention than for the one-stage buck of the prior art. At lower input-to-output voltage ratios (e.g., at input voltages lower than a threshold voltage $V_T$ of about 9V), however, the power loss for the cascaded buck is greater than the power loss for the one-stage buck of the prior art. By adjusting the duty cycle D1 of the two-stage cascaded buck to 1 for lower input-to-output voltage ratios, the power loss is substantially reduced to a level slightly higher than that for the single stage buck of the prior art.

As shown in FIG. 2, the duty cycle controller 110 can be configured to receive both the input $V_{in}$ and output $V_o$ voltages, and to adjust the duty cycles D1 and D2 based on the resultant input-to-output voltage ratios. For example, for a given output voltage $V_o$, the duty cycle D1 can be adjusted by the duty cycle control 110 based on the value of the input voltage $V_{in}$. Specifically, for input voltages lower than a threshold voltage $V_T$, the duty cycle D1 can be set to 1, while for input voltages greater than the threshold voltage $V_T$, the duty cycle D1 can be set equal to D2 or to another suitable value. Accordingly, the two-stage cascaded buck power delivery system of the present invention can be used with a wide range of input-to-output voltage ratios. In more general terms, the duty cycle D1 can be set to 1 by the duty cycle control 110 for input-to-output voltage ratios less than a predetermined threshold input-to-output voltage ratio $R_T$, while for input-to-output voltage ratios higher than $R_T$, the duty cycle D1 can be set equal to D2 or to another suitable value.

The foregoing description of various aspects of the invention has been presented for purposes of illustration and description. It is not intended to be exhaustive or to limit the invention to the precise form disclosed, and obviously, many modifications and variations are possible. For example, in a multiple-stage cascaded buck configuration (i.e., having more than two stages), the first stage can be operated at a duty cycle D=1 to reduce power losses at lower input-to-output voltage ratios. Such modifications and variations that may be apparent to a person skilled in the art are intended to be included within the scope of the invention as defined by the accompanying claims.

The invention claimed is:

1. A power delivery system, comprising:
a plurality of cascaded buck stages connected in series, wherein a last buck stage in the plurality of cascaded buck stages provides an output voltage $V_o$ in response to an input voltage $V_{in}$ applied to a first buck stage of the plurality of cascaded stages; and
a duty cycle control for controlling a duty cycle of each buck stage to maintain the output voltage $V_o$, wherein the duty cycle control sets the duty cycle of the first buck stage of the plurality of cascaded buck stages to 1 if an input-to-output voltage ratio ($V_{in}/V_o$) is lower than a threshold input-to-output voltage ratio $R_T$.

2. The power delivery system of claim 1, wherein each of the plurality of cascaded buck stages comprises one or more interleaved synchronous buck channels arranged in parallel.

3. The power delivery system of claim 2, wherein each buck channel includes first and second switches $SW_1$, $SW_2$, and wherein the first switch $SW_1$ of the first buck stage is always on and the second switch $SW_2$ is always off when the duty cycle of the first buck stage is set to 1 by the duty cycle control.

4. The power delivery system of claim 1, wherein the first buck stage operates as an input filter when the duty cycle of the first buck stage is set to 1 by the duty cycle control.

5. The power delivery system of claim 1, wherein the duty cycle control sets the duty cycle of the first buck stage to a value less than 1 if the input-to-output voltage ratio ($V_{in}/V_o$) is higher than the threshold input-to-output voltage ratio $R_T$.

6. The power delivery system of claim 1, wherein two cascaded buck stages are connected in series.

7. The power delivery system of claim 1, wherein the input voltage $V_{in}$ comprises a bus voltage of about 12 V or a battery voltage of 6-24 V, and the output voltage $V_o$ is a voltage of 0.x-1.x V.

8. The power delivery system of claim 1, wherein the system is operated at a switching frequency of at least one MHz.

9. A method for power delivery, comprising:
connecting a plurality of cascaded buck stages in series, wherein a last buck stage in the plurality of cascaded buck stages provides an output voltage $V_o$ in response to an input voltage $V_{in}$ applied to a first buck stage of the plurality of cascaded stages; and
controlling a duty cycle of each buck stage to maintain the output voltage $V_o$, wherein the duty cycle of the first buck stage of the plurality of cascaded buck stages is set to 1 if an input-to-output voltage ratio ($V_{in}/V_o$) is lower than a threshold input-to-output voltage ratio $R_T$.

10. The power delivery method of claim 9, wherein each of the plurality of cascaded buck stages comprises one or more interleaved synchronous buck channels arranged in parallel.

11. The power delivery method of claim 10, wherein each buck channel includes first and second switches $SW_1$, $SW_2$, and wherein the first switch $SW_1$ of the first buck stage is always on and the second switch $SW_2$ is always off when the duty cycle of the first buck stage is set to 1.

12. The power delivery method of claim 9, wherein the first buck stage operates as an input filter when the duty cycle of the first buck stage is set to 1.

13. The power delivery method of claim 9, wherein the duty cycle of the first buck stage is set to a value less than 1 if the input-to-output voltage ratio ($V_{in}/V_o$) is higher than the threshold input-to-output voltage ratio $R_T$.

14. The power delivery method of claim 9, wherein two cascaded buck stages are connected in series.

15. The power delivery method of claim 9, wherein the input voltage $V_{in}$ comprises a bus voltage of about 12 V or a battery voltage of 6-24 V, and the output voltage $V_o$ is a voltage of 0.x-1.x V.

16. The power delivery method of claim 9, further comprising:
operating the system at a switching frequency of at least one MHz.

17. A quasi-single-stage power delivery system, comprising:
first and second cascaded buck stages connected in series, wherein the second buck stage provides an output voltage $V_o$ in response to an input voltage $V_{in}$ applied to the first buck stage; and
a duty cycle control for controlling duty cycles of the first and second buck stages to maintain the output voltage $V_o$, wherein the duty cycle of the first buck stage is set to 1 if an input-to-output voltage ratio ($V_{in}/V_o$) is lower than a threshold input-to-output voltage ratio $R_T$, and wherein the duty cycle of the first buck stage is set to a value less than 1 if the input-to-output voltage ratio ($V_{in}/V_o$) is higher than the threshold input-to-output voltage ratio $R_T$.

18. The quasi-single-stage power delivery system of claim 17, wherein the first and second buck stages each comprise one or more interleaved synchronous buck channels arranged in parallel.

19. The quasi-single-stage power delivery system of claim 18, wherein each buck channel includes first and second switches $SW_1$, $SW_2$, and wherein the first switch $SW_1$ of the first buck stage is always on and the second switch $SW_2$ of the first buck stage is always off when the duty cycle of the first buck stage is set to 1 by the duty cycle control.

20. The quasi-single-stage power delivery system of claim 17, wherein the first buck stage operates as an input filter when the duty cycle of the first buck stage is set to 1 by the duty cycle control.

* * * * *